March 24, 1931.   C. ARENS   1,798,009
POWER TRANSMITTING DEVICE
Filed March 17, 1928   2 Sheets-Sheet 1
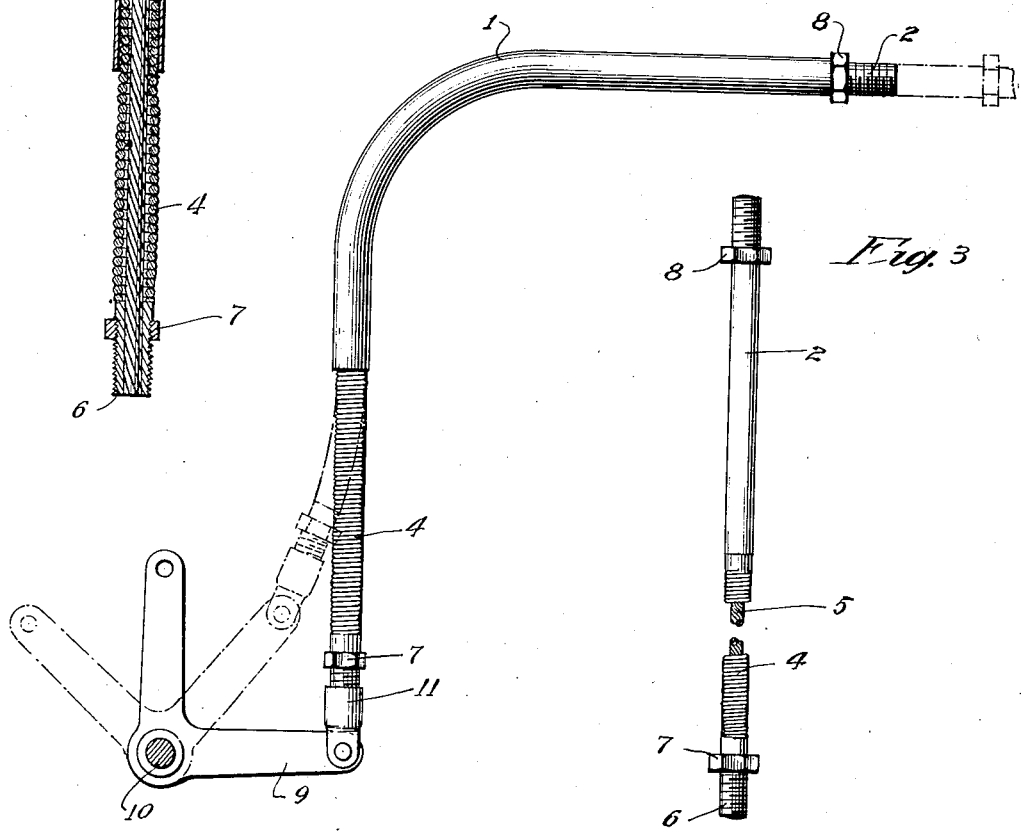

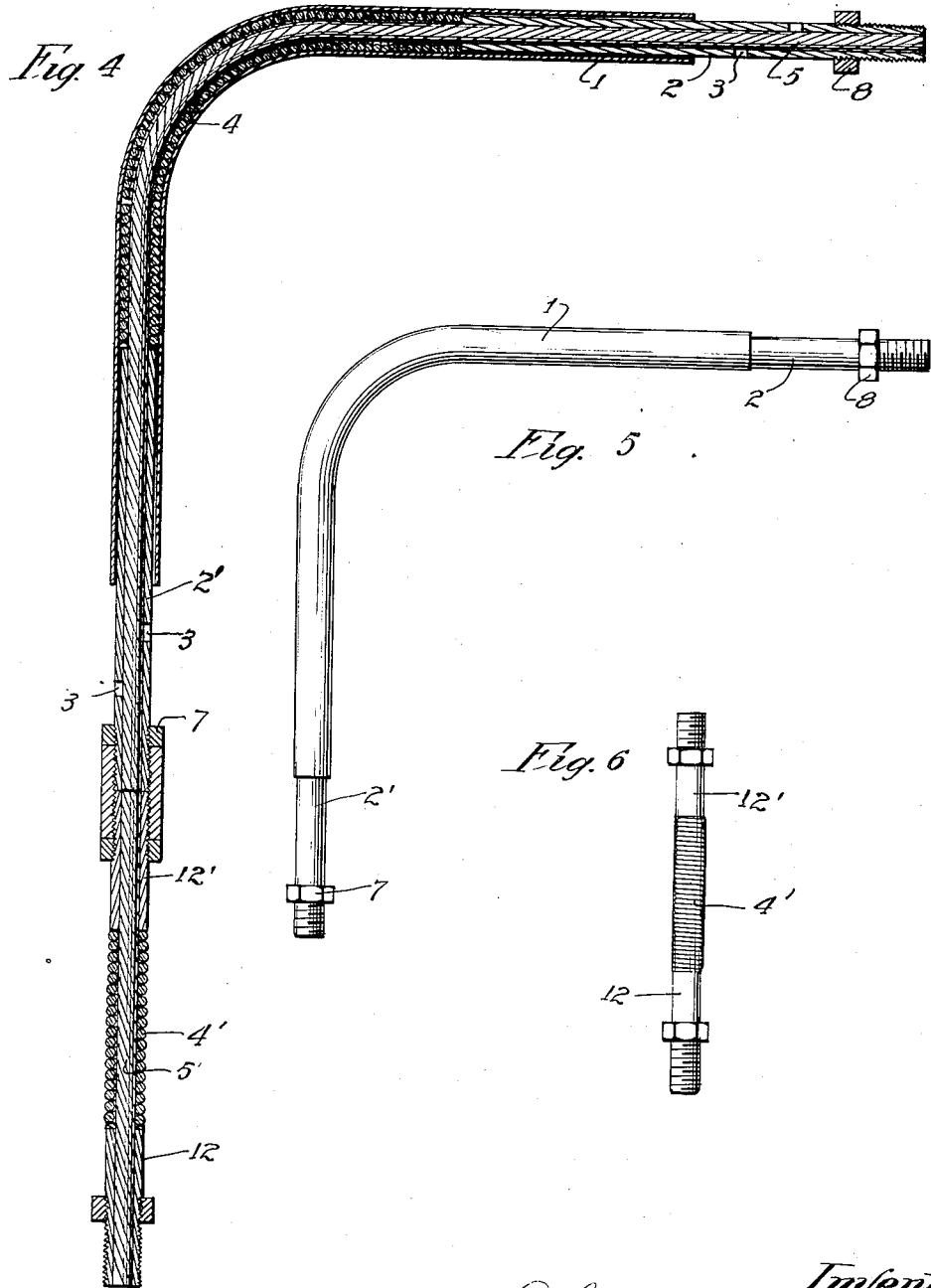

Patented Mar. 24, 1931

1,798,009

UNITED STATES PATENT OFFICE

CHARLES ARENS, OF CHICAGO, ILLINOIS

POWER-TRANSMITTING DEVICE

Application filed March 17, 1928. Serial No. 262,500.

The object of this invention is the provision of a tension and compression power transmitting device that will slide easily around a bend in the tube within which it is inserted and at the same time permit the end of the device to be attached to a control lever so that the end of the device may bend or flex laterally to accommodate itself to the path of movement of the lever.

Another object resides in the construction of a device that will readily transmit torsional stress for the purpose of imparting rotational movement around a bend in a passage to the element operated, as, for instance, the stem of a watch or clock.

Other objects of the invention reside in the details of construction and arrangement of parts illustrated in the drawings and described in the annexed specification.

In the drawings—

Fig. 1 is a sectional view of the preferred embodiment of my invention;

Fig. 2 is a view in elevation showing the action of the end of the power transmitting member when connected to a control lever;

Fig. 3 is a view showing the power transmitting member without the guiding casing;

Fig. 4 is a sectional view of a modification; and

Figs. 5 and 6 are elevational views of the parts assembled in Fig. 4.

My invention is adapted to extend from the dashboard of an automobile to a position under the hood where it may be attached at one end to a control lever, as for instance, the choke-valve on a carbureter or to a lever controlling the ignition, etc. However, my invention is useful in any situation where it is necessary to transmit power by pushing and pulling and where the power transmitting device must pass around a turn.

Referring to Figs. 1 to 3, inclusive, 1 is a guiding tube through which the power transmitting member passes. The power transmitting member may be inserted in the tube at the time of manufacture and the whole constitute a single article, or the tube may merely exist as a curved passage in the structure to which my flexible power transmitting member is to be applied. The flexible power transmitting device comprises end members 2 and 6 joined by a cable 5 surrounded by a spring 4 between the end members. The cable may pass through the holes in the end members 2 and 6 and attached by soldering or otherwise. The end member 6 is an anchoring member to which a lever or other operating element may be attached. The spring 4 is closely wound and bears against the end members 2 and 6, as shown. The member 2 is considerably longer than the member 6 and when in its innermost position its end may extend close to the curved part of the tube. Both of the members 2 and 6 are threaded for the reception of a nut 7 which may serve as abutments and the member 2 is provided with recesses 3 for lubrication. The construction so far described is substantially the same as that shown in my Patent No. 1,601,099, issued September 28, 1926. In the patent, the end member to which the element to be controlled is attached extends within the tube causing the parts to bind in case the element or lever controlled moves in a path other than a straight line. In order to overcome this difficulty I allow the cable and surrounding spring to extend beyond the tube or casing to permit the power transmitting device to bend or flex when it is attached to a lever or controlling element constrained to move in a path not in alinement with the controlling element. This is clearly illustrated in Fig. 2 which shows in dotted lines the position assumed by the spring 4 and cable 5 when a lever is rotated by pulling on the end member 2. As shown, the end member 6 is considerably shorter than the end member 2 and may have threaded therein an element 11 serving as a connection to the lever 9 fulcrumed at 10. The spring 11 is closely wound and presents a smooth outer surface so that it may readily slide in and out past the end of the tube. The cable 5 transmits the power through tension when the end member 2 is pulled and the spring 4 takes the compression when the end member 2 is pushed within the tube.

Referring to the modification shown in Figs. 4 to 6, inclusive, it will be seen that the anchoring member 2' is in the form of a sliding member extending into the casing the same as the slide member 2. The numerals 1 to 8 in this modification denote the same parts as shown in Figs. 1 to 3, inclusive. The second slide member 2', however, has attached thereto a flexible tension and compression power transmission member comprising threaded end members 12 and 12' connected by a cable 5' surrounded by a spring 4' between the end members. The end members 2' and 12' or 12 may be connected by a sleeve, as shown in Fig. 4. The last-mentioned tension and compression member serves the same purpose as the flexible portion of the power transmitting member extending beyond the guiding tube illustrated in Figs. 1 and 2. The end member 12 may be coupled to a lever or other control medium by a coupling similar to that shown in Fig. 2.

Where the end of the device is attached to an element the control of which necessitates the transmission of torsional stress by rotating the power transmitting member, as, for instance, in winding a clock, the spring 4 surrounding the cable will be soldered or fastened to the end members 2 and 6 in Figs. 1 to 3, or to the end members 2 and 2' in Figs. 4 and 5.

Where a coil is used, the separate coils thereof form separable ring-like elements which separate the necessary amount toward the side of the bend having the greater curvature, as illustrated in Fig. 1, where the ends of the ring-like elements or coils of the spring 4 are slightly separated at the left or upper side of the curve. In case the separable ring-like elements are constituted by separate washers, the washers must be thin enough to allow them to pass around the bend by permitting the ends of the washers or rings to separate sufficiently at the ends adjacent the side of the curve of greater curvature.

I claim:—

1. In combination with a guiding casing having a bend therein, of a tension and compression power transmitting member adapted at one end to be attached to a control lever having curvilinear movement, said member comprising a flexible cable within said casing extending around said bend and beyond one end thereof, and a coil spring surrounding said cable and extending around said bend and beyond the end of said casing to permit lateral flexing of the portion of said member extending beyond said casing sufficient to accommodate curvilinear movement of said lever, said cable and spring being secured together substantially at the point of connection of the same with said lever.

2. In a flexible power transmitting unit, the combination with a casing, of a flexible tension transmitting element extending through said casing and beyond one end thereof, a coiled compression transmitting element surrounding said tension element and also extending beyond the said end of said casing, and means for holding the extending portions of said tension and compression members in fixed relation with each other to form a unitary flexible element which is laterally flexible beyond said casing, said coiled compression element having the turns thereof wound closely to each other.

3. In a flexible power transmitting unit, the combination with a casing, of a rigid member slidable in one end of said casing, a flexible tension element connected at one end to said rigid member and extending beyond the end of said casing, a coiled compression transmitting element embracing said tension element and also attached at one end to said rigid member and extending beyond said casing, and means for holding the other ends of said elements in fixed relation to each other at a point beyond the end of said casing to permit lateral flexing of said combined elements.

4. In a flexible control unit, the combination with a casing, of a rigid member slidable within said casing, a second rigid member outside of one end of said casing, a flexible tension transmitting element connecting said members, a coiled compression element embracing said first element and connected to both of said members, the convolutions of said coiled compression element being in abutting relation with each other when transmitting a compressional force exerted thereon.

5. In a flexible power transmitting unit, the combination with a casing of a rigid member slidable in one end of said casing, means for moving said member longitudinally of said casing, a flexible tension element positioned beyond said casing and releasably connected to said rigid member which is slidable within said casing, a coiled compression element embracing said flexible tension element, the coils of said compression element being in abutting relation with each other and means for holding the opposite ends of said compression element in fixed relation to the ends of said flexible tension transmitting element.

In testimony whereof I have signed my name to this specification on this 14th day of March, A. D. 1928.

CHARLES ARENS.